US006269995B1

(12) United States Patent
Rich et al.

(10) Patent No.: US 6,269,995 B1
(45) **Date of Patent: *Aug. 7, 2001**

(54) FRICTION DRIVE APPARATUS FOR STRIP MATERIAL

(75) Inventors: Leonard G. Rich, West Hartford; Ronald B. Webster, Ellington; Mark E. Guckin, Middletown, all of CT (US)

(73) Assignee: Gerber Scientific Products, Inc., Manchester, CT (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/069,392

(22) Filed: Apr. 29, 1998

(51) Int. Cl.[7] .......................... B23Q 15/00; B65H 43/08; B65H 23/18

(52) U.S. Cl. .................................. 226/17; 226/20; 226/4; 226/42; 271/228

(58) Field of Search ................................ 226/16, 17, 20, 226/42, 4, 3; 271/226, 227, 228

(56) References Cited

U.S. PATENT DOCUMENTS 1,822,902 * 9/1931 Osborne ............................ 226/16 X
2,082,634 6/1937 Johnstone .
2,220,736 * 11/1940 Stockbarger et al. ............ 226/16 X (List continued on next page.)

FOREIGN PATENT DOCUMENTS 195 11 682 10/1996 (DE) .
195 13 622 10/1996 (DE) .
0 382 502 8/1990 (EP) .
0 485 167 5/1992 (EP) .
501 604 9/1992 (EP) .
512 827 11/1992 (EP) .
0 697 361 2/1996 (EP) .
0 814 040 12/1997 (EP) .
58-193181 11/1983 (JP) .
61-217457 9/1986 (JP) .
10-075335 3/1989 (JP) .
3-264372 11/1991 (JP) .
6-103009 4/1994 (JP) .
6-263291 9/1994 (JP) .
8-026532 1/1996 (JP) .
08-053231 2/1996 (JP) .
8-169595 7/1996 (JP) .
9-188442 7/1997 (JP) .
WO97/32730 9/1997 (WO) .

OTHER PUBLICATIONS

Kanno, T,; "Sheet–Rotating Mechanism", IBM Technical Disclosure Bulletin, Vol. 25, No. 12, pp. 6656–6659 May 1983.

U.S. Patent Application Serial No. 09/217,667, filed Dec. 21, 1998 in the name of Daren Yeo et al.

*Primary Examiner*—Michael R. Mansen
(74) *Attorney, Agent, or Firm*—McCormick, Paulding & Huber LLP

(57) ABSTRACT

A friction drive apparatus for feeding strip material in a longitudinal direction includes a first friction wheel and a second friction wheel rotated by a first motor drive and a second motor drive, respectively. The friction drive apparatus also includes a sensor disposed behind the friction wheels with respect to the motion of the strip material to detect a lateral or skewing error and a motion processor that drives the first and the second motor drives independently at different speeds to correct the lateral or skewing error of the strip material. The friction drive apparatus also detects a longitudinal error of the strip material by tracking an actual position of the strip material and comparing it to the commanded position to correct the error. If there is a discrepancy between the actual position and the commanded position of the strip material, the rotational speed of each friction wheel is either decreased or increased to correct any longitudinal creep or slippage, respectively, of the strip material.

21 Claims, 3 Drawing Sheets

U.S. PATENT DOCUMENTS

| | | | | |
|---|---|---|---|---|
| 2,840,721 | | 6/1958 | Frommer . | |
| 3,323,700 | | 6/1967 | Epstein et al. . | |
| 3,368,726 | | 2/1968 | Funk et al. . | |
| 3,727,817 | | 4/1973 | Tibavido . | |
| 3,857,525 | | 12/1974 | Gerber et al. . | |
| 4,216,482 | | 8/1980 | Mason . | |
| 4,262,894 | | 4/1981 | Marano . | |
| 4,291,825 | | 9/1981 | Glanz . | |
| 4,303,189 | | 12/1981 | WIley et al. . | |
| 4,326,656 | | 4/1982 | Gregory et al. . | |
| 4,438,917 | | 3/1984 | Janssen et al. . | |
| 4,485,982 | | 12/1984 | St. John et al. . | |
| 4,567,492 | * | 1/1986 | Skafenstedt et al. | 226/17 X |
| 4,629,177 | | 12/1986 | Roddeman et al. . | |
| 4,683,480 | | 7/1987 | Sakamoto et al. . | |
| 4,697,694 | | 10/1987 | Huber . | |
| 4,734,716 | | 3/1988 | Silverberg et al. . | |
| 4,778,170 | | 10/1988 | Hynes . | |
| 4,824,090 | | 4/1989 | Booth, Sr. et al. . | |
| 4,839,674 | | 6/1989 | Hanagata et al. . | |
| 4,848,632 | * | 7/1989 | Mack et al. | 226/20 X |
| 4,903,045 | | 2/1990 | Sakamoto et al. . | |
| 4,959,040 | | 9/1990 | Gardner et al. . | |
| 5,000,032 | | 3/1991 | Nakashima et al. . | |
| 5,027,133 | * | 6/1991 | Weiselfish | 226/42 X |
| 5,060,926 | | 10/1991 | Murai et al. . | |
| 5,127,513 | | 7/1992 | Huber . | |
| 5,163,675 | | 11/1992 | Sunohara . | |
| 5,169,140 | | 12/1992 | Wenthe, Jr. . | |
| 5,172,907 | | 12/1992 | Kalisiak . | |
| 5,215,184 | | 6/1993 | Huber . | |
| 5,289,206 | | 2/1994 | Ishikawa et al. . | |
| 5,289,788 | | 3/1994 | Fukumoto . | |
| 5,405,205 | | 4/1995 | Venthem et al. . | |
| 5,527,027 | | 6/1996 | Flade et al. . | |
| 5,549,291 | | 8/1996 | Devito . | |
| 5,645,361 | | 7/1997 | Mitsushima et al. . | |
| 5,672,020 | | 9/1997 | Leonard et al. . | |
| 5,678,159 | | 10/1997 | Williams et al. . | |
| 5,697,609 | | 12/1997 | Williams et al. . | |
| 5,711,470 | * | 1/1998 | Thompson | 226/16 X |
| 5,715,514 | | 2/1998 | Williams et al. . | |
| 5,887,996 | | 3/1999 | Castelli et al. . | |

* cited by examiner

FRICTION DRIVE APPARATUS FOR STRIP MATERIAL

TECHNICAL FIELD

The present invention relates to friction drive apparatus such as printers, plotters and cutters that feed strip material for producing graphic images and, more particularly, to friction drive apparatus which detect and correct the longitudinal and lateral displacements of the strip material.

BACKGROUND OF THE INVENTION

Friction, grit, or grid drive systems for moving strips or webs of sheet material longitudinally back and forth along a feed path through a plotting, printing, or cutting device are well known in the art. In such drive systems, friction (or grit or grid) wheels are placed on one side of the strip of sheet material (generally vinyl or paper) and pinch rollers, of rubber or other flexible material, are placed on the other side of the strip, with spring pressure urging the pinch rollers and material against the friction wheels. During plotting, printing, or cutting, the strip material is driven back and forth, in the longitudinal or X-direction, by the friction wheels while, at the same time, a pen, printing head, or cutting blade is driven over the strip material in the lateral or Y-direction.

These systems have gained substantial favor due to their ability to accept plain (unperforated) strips of material in differing widths. However, the existing friction feed systems experience several problems. One problem is longitudinal slippage or creep error in the X-direction. The longitudinal slippage or creep occurs when the strip material moves either too slowly or too fast, respectively, in the X-direction. This problem is most pronounced in long plots, i.e. those two or more feet in length, and those in which the strip material moves back and forth in the X-direction with respect to a tool head such as a plotting pen, print head, or cutting blade. Longitudinal slippage or creep is highly undesirable because the operations performed on the strip material become inaccurate.

Another error that occurs in friction feed systems is a skew error. The skew error will arise as a result of strip material being driven unevenly between its two longitudinal edges, causing the strip material to assume a cocked position. The error is integrated in the lateral or Y-direction and produces an increasing lateral position error as the strip material moves along the X-direction. The error is often visible when the start of one object must align with the end of a previously plotted object. In the worst case, such lateral errors result in the strip drifting completely off the friction wheel.

SUMMARY OF THE INVENTION

It is an object of the present invention to detect and correct the longitudinal and lateral displacements of strip material being fed through a friction drive apparatus.

According to the present invention, a friction drive apparatus for feeding strip material in a longitudinal direction along a feed path includes first and second friction wheels associated with first and second longitudinal edges of the strip material, respectively, and a motion processor for rotating the first and second friction wheels independently at different speeds to correct lateral deviation of the strip material from the feed path. The friction drive apparatus also includes first and second motor drives rotating the first and second friction wheels, respectively, and at least one sensor.

In the best mode embodiment, the sensor disposed behind the friction wheels, as viewed in the direction of motion of the strip material, detects lateral deviation of the strip material from the feed path. The sensor signal is processed by the motion processor which commands the motor drives to rotate the friction wheels at different speeds to correct the lateral error.

The friction drive apparatus also includes means for detecting the actual longitudinal position of the strip material. The motion processor compares the actual longitudinal position of the strip material with the commanded longitudinal position. In the event of a discrepancy between the two positions, an error signal generated by the processor drives the friction wheels until the actual position and the commanded position of the strip material coincide.

Thus, the friction drive apparatus of the present invention detects both lateral and longitudinal deviations of the strip material from the feed path and corrects both types of errors before a noticeable error occurs in a graphic image of a work operation performed by a tool head on the strip material. The errors are corrected without interrupting the work operation.

The foregoing and other advantages of the present invention become more apparent in light of the following detailed description of the exemplary embodiments thereof, as illustrated in the accompanying drawings.

DESCRIPTION OF THE PREFERRED EMBODIMENT

Figure 1:
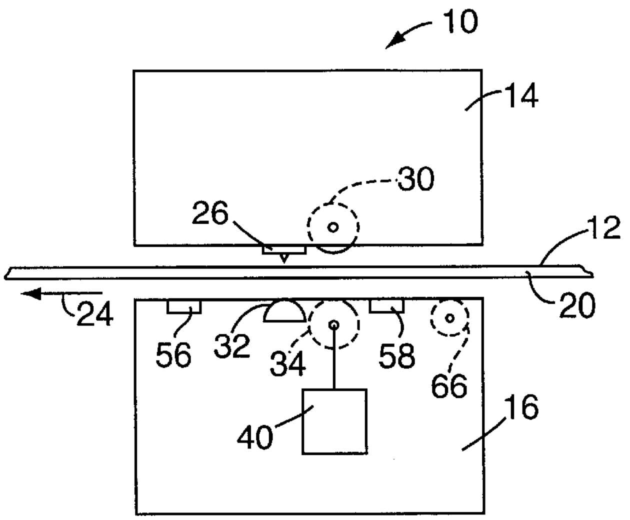
FIG. 1 is an exploded side elevational view schematically showing a friction drive apparatus, according to the present invention.
Figure 2:
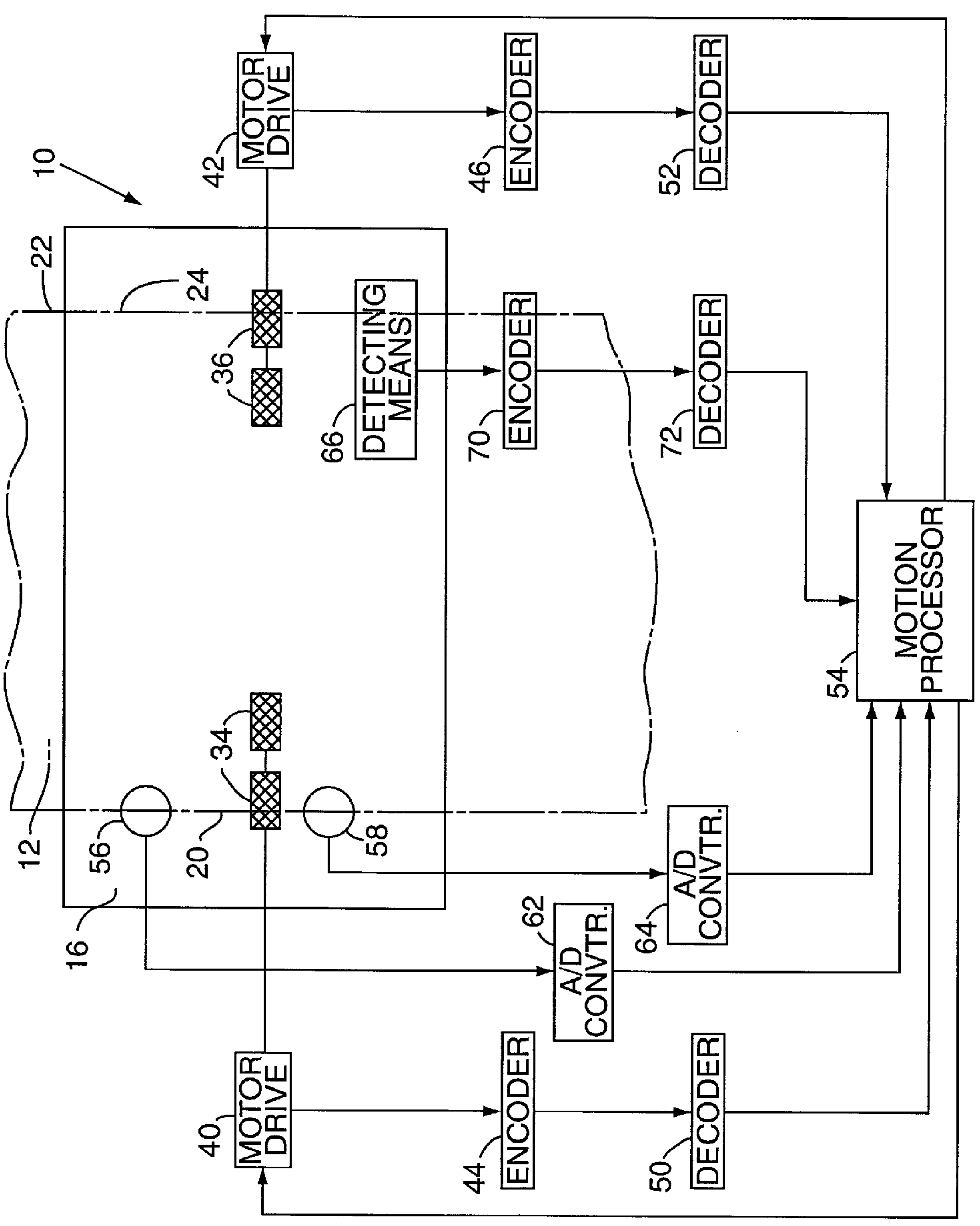
FIG. 2 is a top plan view of a bottom portion of the friction drive apparatus of FIG. 1 with the strip material shown in phantom.

Referring to FIG. 1, an apparatus 10 for plotting, printing, or cutting strip material 12 includes a top portion 14 and a bottom portion 16. The strip material 12, having longitudinal edges 20, 22, as best seen in FIG. 2, is moving in a longitudinal or X-direction along a feed path 24. The top portion 14 of the apparatus 10 includes a tool head 26 movable in a lateral or Y-direction perpendicular to the X-direction and the feed path 24. The top portion 14 also includes a plurality of pinch rollers 30 that are disposed along the longitudinal edges 20, 22 of the strip material 12. The bottom portion 16 of the apparatus 10 includes a stationary or roller platen 32, disposed in register with the tool head 26, and a plurality of friction wheels 34, 36, disposed in register with the pinch rollers 30.

Referring to FIG. 2, each friction wheel 34, 36 has a surface for engaging the strip material 12, and is driven by a motor drive 40, 42, respectively. Each motor drive 40, 42 may be a servo-motor with a drive shaft connected to a shaft encoder 44, 46 for detecting rotation of the drive shaft. Each encoder 44, 46 is connected to a decoder 50, 52, respectively. Each decoder 50, 52 is in communication with a motion processor 54. The apparatus 10 also includes a first sensor 56 and a second sensor 58 for tracking the longitudinal edge of the strip material 12, with sensors 56, 58 being disposed on opposite sides of the friction wheels. Each sensor 56, 58 is connected to an A/D converter 62, 64, respectively, with both A/D converters 62, 64 being in communication with the motion processor 54. The motion processor 54 also communicates with each motor drive 40,42 to complete a closed loop system.

The apparatus 10 also includes a detecting means 66 for tracking an actual longitudinal position of the strip material 12. The detecting means 66 is connected to a tracking encoder 70 and a tracking decoder 72 which communicate with the motion processor 54.

In operation, as the strip material 12 is fed along the feed path 24 in the longitudinal or X-direction, the friction wheels 34, 36 and the pinch rollers 30 are urged together and engage the strip material 12, as best seen in FIGS. 1 and 2. The motor drives 40, 42 rotate the friction wheels 34, 36, respectively, at substantially the same speed to ensure that both longitudinal edges 20, 22 of the strip material 12 progress along the feed path 24 in the X-direction simultaneously. As the strip material 12 moves in the longitudinal or X-direction, the tool head 26 moves in a lateral or Y-direction, either plotting, printing, or cutting the strip material depending on the specific type of the tool employed. The detecting means 66 tracks the exact position of the strip material 12 in the X-direction.

Figure 3:
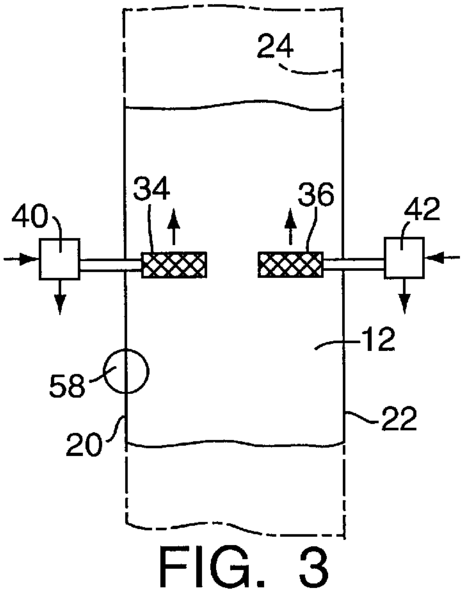
FIG. 3 is a schematic representation of a strip material moving properly along a feed path for the material in the drive apparatus of FIGS. 1 and 2.

Referring to FIG. 3, the sensor 58, disposed behind the friction wheels 34, 36 with respect to the strip material motion indicated by the arrow, detects and ensures that the strip material does not move laterally in the Y-direction. The sensor 58 and its associated circuitry (not shown) produces an analog output signal proportional to the surface area of the sensor exposed. In the preferred embodiment of the present invention, the sensor 58 and its associated circuitry is biased to produce zero (0) volts when the sensor 58 is covered fifty percent (50%). The sensor 58 will output a positive or negative analog signal when a greater or lesser area of the sensor 58 is covered, respectively. The motion processor 54 is set to position the strip material over exactly fifty percent (50%) of the sensor 58 when the strip material 12 is moving in the longitudinal or X-direction properly. Thus, with proper longitudinal positioning of the strip material, that is, with no Y-position error, the sensor 58 generates a zero (0) output signal, and the motor drives 40, 42 rotate friction wheels 34, 36 simultaneously at the same speed.

Figure 4:
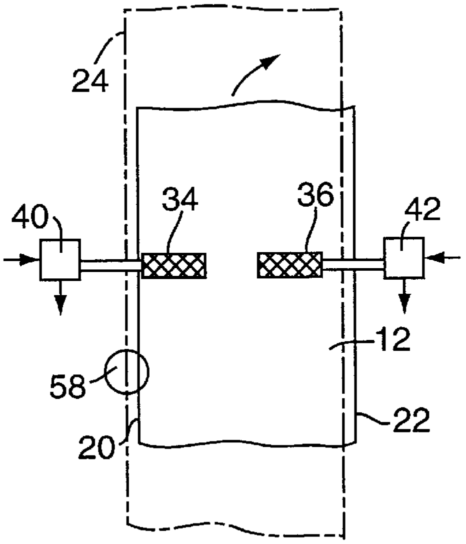
FIG. 4 is a schematic representation of the strip material deviating from the feed path of FIG. 3 and a correction initiated by adjusting the relative speeds of drive motors.

Referring to FIG. 4, a Y-position error occurs when the strip material 12, for example, moves to the right exposing more than fifty percent (50%) of the sensor. When more than fifty percent (50%) of the sensor is exposed, the sensor 58 and its associated circuitry generates a negative output to the motion processor 54 via the A/D converter 64, as best seen in FIG. 2. Once the motion processor 54 receives a negative output from the sensor 58, the motion processor 54 imposes a differential signal on the signals to the motor drives 40,42 to increase the speed of the motor drive 40, driving friction wheel 34, and to decrease the speed of the motor drive 42, driving friction wheel 36. The differential signal and resulting differential velocities of the friction wheels vary in proportion to the Y-direction error detected by the sensor 58. As the motor drives 40, 42 rotate friction wheels 34, 36 at different speeds, the front portion of strip material 12 is skewed to the right, as indicated by the arrow, and the rear portion of the strip material is skewed to the left to cover a greater portion of the sensor 58. As the skewed strip material 12 continues to move in a longitudinal or X-direction, more of the sensor 58 becomes covered.

Figure 5:
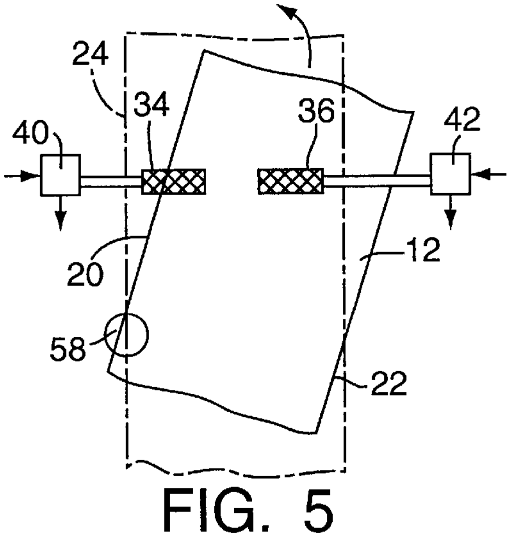
FIG. 5 is a schematic representation of the strip material deviating from the feed path of FIG. 3 and the correction completed by adjusting the relative speeds of the drive motors.

When fifty percent (50%) of the sensor is covered, as shown in FIG. 5, the sensor 58 returns to zero output and the motor processor 54 has reduced the differential signal to zero. At this instant, the strip material 12 is skewed as shown, but moves directly forward in the X-direction because the motor drives 40, 42 are driving the friction wheels at the same speed. In effect, the skewed position of the strip material causes the Y-position error at the sensor 58 to be integrated as the strip material moves forward in the X-direction. Once an area greater than fifty percent (50%) of the sensor 58 is covered, the sensor 58 sends a positive signal to the motion processor 54 and the motion processor 54 imposes a differential signal on the signals to the motor drives 40, 42 to decrease speed of the motor drive 40 and friction wheel 34 and increase the speed of the motor drive 42 and friction wheel 36. The difference in rotational speeds of the friction wheels 34, 36 now turns and skews the strip material to the left, in the direction of the slower rotating friction wheel 34, as indicated by the arrow, which begins to uncover sensor 58. The differential rotational speed of the friction wheels 34, 36 continues until the strip material 12 covers only fifty percent (50%) of the sensor 58 and the differential signal from the motion processor fades out. The motion processor 54 then applies equal drive signals to the motor drives 40, 42 and the friction wheels 34, 36 are driven at the same rotational speed.

The strip material 12 again moves in the X-direction. If at this time the strip material is still skewed in the Y-direction, because the motion processor is under-damped or over-damped, the forward motion in the X-direction will again integrate the Y-position error and the sensor 58 will signal the motion processor to steer the strip material back to a central position over the sensor 58 with corrective skewing motions as described above. The skewing motions will have the same or opposite direction depending upon the direction of the Y-position error.

When the feed of the strip material 12 in the X-direction is reversed, control of the Y-position error is switched by the motion processor 54 from the sensor 58 to the sensor 56, which now disposed behind the friction wheels 34, 36 with respect to the strip material 12 motion. The Y-position error is then detected at the sensor 56, but is otherwise controlled in the same manner as described above.

Referring to FIG. 2, to detect and correct a slippage or creep error in the longitudinal or X-direction, the output from the detecting means 66 is compared to the commanded position already known within the motion processor 54. Once a discrepancy between the actual position of the strip material 12 and the commanded position of the strip material is detected, the motion processor 54 signals the motor drives 40, 42 to either increase or decrease the speed of both of the friction wheels 34, 36 simultaneously. Either increasing or decreasing the moving speed of the strip material 12 simultaneously will ensure that the true position of the strip material matches with the commanded position of the strip material. Once the two positions coincide, the speed of the friction wheels 34, 36 will return to normal.

To avoid sudden jumps in either plotting, printing, or cutting operations, the increasing or decreasing speed commands are incremental. Small increments are preferred so that the error is corrected gradually.

Figure 6:
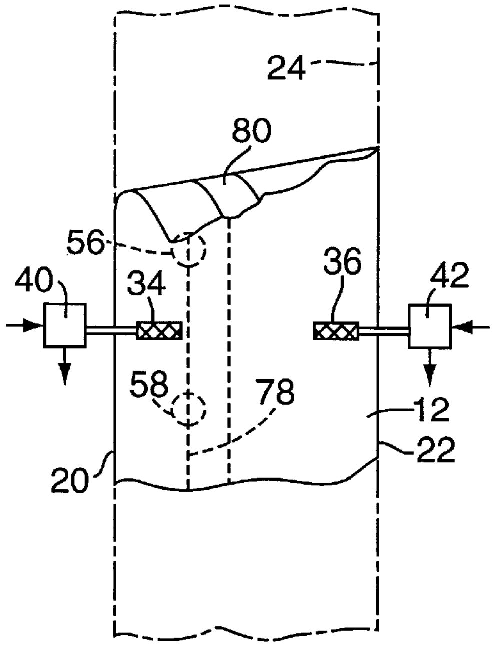
FIG. 6 is a schematic representation of an alternate embodiment of the strip material moving along the feed path in the drive apparatus of FIG. 1.

Referring to FIG. 6, in an alternate embodiment of the present invention, sensors 56, 58 can be positioned along an edge 78 of a stripe 80 marked on the underside of the strip material 12. The stripe 80 is spaced away in a lateral direction from either of the longitudinal edges 20, 22 of the strip material 12 and extends in the longitudinal direction. The Y-position error is detected by the sensors 56, 58 and corrected in the manner described above with the edge 78 of the stripe 80 functioning analogously to the longitudinal edge 20 of the strip material 12.

Figure 7:
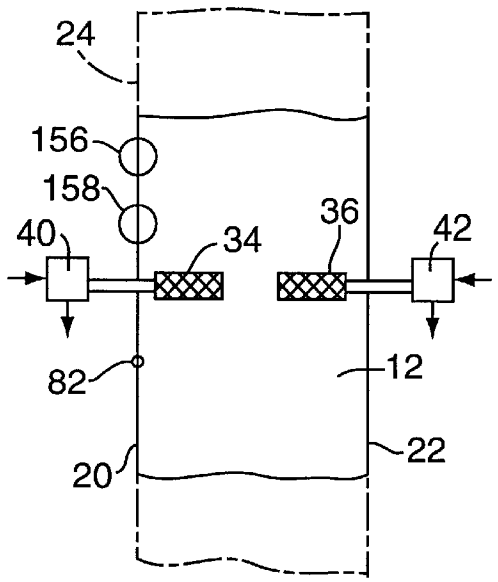
FIG. 7 is a schematic representation of another alternate embodiment of the strip material moving along the feed path in the drive apparatus of FIG. 1.

Referring to FIG. 7, another alternate embodiment of the present invention uses a pair of sensors 156, 158 disposed at predetermined positions in front of the friction wheels 34, 36, as viewed in the direction of motion of the strip material 12. A steering reference point 82 is defined a predetermined distance behind the friction wheels, as viewed in the direction of motion of the strip material 12. Based on the inputs from sensors 156,158, the motion processor 54 determines a lateral error at the steering reference point 82. If it is determined that there is no error at the steering reference point 82, the friction wheels are driven simultaneously. However, if it is determined that there is a skewing or lateral error at the steering reference point 82, the motion processor 54 steers the motor drives and subsequently the friction wheels to straighten the strip material 12 in the manner described above.

The present invention monitors the position of the strip material 12 to ensure proper movement of the strip material along the feed path 24. Once a deviation of the strip material is detected, the friction drive apparatus 10 of the present invention corrects lateral error and also longitudinal error before a noticeable discrepancy in the plot occurs. Each correction takes place during the work operation without interruption. The differential signals imposed on the motor drives to correct the lateral and longitudinal errors are proportional to the magnitude of the error and are applied in small increments to preserve the integrity of the plot. The present invention monitors and controls the position of the strip material even when the direction of the movement of the strip material is reversed.

One advantage of the present invention is that the feed path is not obstructed with mechanical objects. Another advantage of the present invention is that, in the best mode embodiment, only one sensor is needed to monitor the lateral position of the strip material as the strip moves in one direction. A further advantage of the present invention is that the friction wheels are used for the combined purpose of advancing the strip material during the work operation of the apparatus and for correcting the alignment and position of the strip material.

The sensors 56, 58, 156, 158 used in the preferred embodiment of the present invention are large area diffuse sensors, which can have a time constant of fractions of a second (0.1 second is satisfactory). These sensors preferably have an output proportional to the illuminated area. This can be accomplished with the photoresistive sensors, such as Clairex type CL700 Series and simple No. 47 lamps. Alternatively, a silicon photo diode can be used with a diffuser-window about one half of an inch (½") in diameter and a plastic lens to focus the window on the sensitive area of the diode, which is usually quite small compared to the window. In another preferred embodiment of the present invention, digital sensors are used to monitor the position and alignment of the strip material. Use of digital sensors eliminates the need for A/D converters. One type of digital sensor that can be used is a linear sensor array model number TSL401, manufactured by Motorola, Inc. having a place of business at Austin, Tex. Still other types of optical, magnetic, capacitive or mechanical sensors can be used.

The detecting means 66, shown in FIG. 2, in the preferred embodiment of the present invention is a free running sprocket wheel. The sprocket wheel, including pins to engage punched holes in the strip material 12 and an encoder, is placed under the strip material so that the strip material 12 rotates the wheel as the strip material moves through the apparatus. There is no drive connected to the wheel, and the wheel inertia is kept very low so that the material 12 is able to rotate the wheel without impeding motion due to acceleration or friction. However, use of other detecting means, such as optically readable encoders, magnetic encoders, or free running pin or star wheels, is also possible.

While a variety of general purpose micro processors can be used to implement the present invention, the preferred embodiment of the present invention uses a micro processor and a digital signal processor. One type of the micro processor that can be used is a micro processor model number MC68360 and a digital signal processor model number DSP36303, both manufactured by Motorola, Inc., having a place of business in Austin, Tex.

Although the preferred embodiment of the present invention depicts the apparatus having the friction wheels 34, 36 disposed within the bottom portion 14 and the pinch rollers 30 disposed within the top portion 16, the location of the friction wheels 34, 36 and pinch rollers 30 can be reversed. Similarly, the sensors 56, 58 can be disposed within the top portion 16 of the apparatus. Furthermore, the preferred embodiment of the present invention describes sensors 56, 58 and their associated circuitry to be biased to produce zero (0) volts when sensors 56, 58 are covered fifty percent (50%). However, sensors 56, 58 and their associated circuitry can be biased to produce a different predetermined voltage value when sensors 56, 58 are covered fifty percent (50%) and a corresponding predetermined voltage ranges when a greater or lesser area of sensors 56, 58 is covered. Additionally, it will be understood by those of ordinary skill in the art that sensors 56, 58 and their associated circuitry can be biased to produce zero (0) volts when sensors 56, 58 are covered any predetermined amount. Moreover, although the wheels 34, 36 are referred to as friction wheels throughout the specification, it will be understood by those skilled in the pertinent art that the wheels 34, 36 can be either friction, embossed, grit, grid or any other type of a wheel that engages the strip material.

Figure 8:
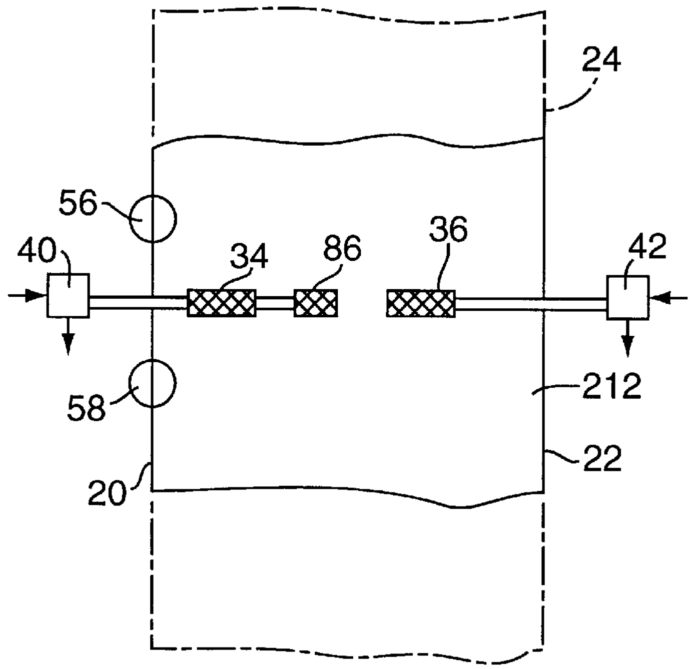
FIG. 8 is a schematic representation of a wide strip material moving along the feed path in the drive apparatus of FIG. 1.

Although FIGS. 3–6 show one friction wheel associated with each longitudinal edge of the strip material, a lesser or greater number of friction wheels driving the strip material can be used. Referring to FIG. 8, for wide strip material 212 used with larger printers, plotters and/or cutters, in the preferred mode of the present invention, a third friction wheel 86 is used to drive the middle portion of the strip material 212. The third friction wheel 86 is coupled to the first friction wheel 34. The force of the pinch roller 30, shown in FIG. 1, corresponding to the third friction wheel

86, is lower to avoid interference with the lateral steering of the strip material 212. However, the third friction wheel 86 is activated to reduce longitudinal positional error of the strip material 212.

While the present invention has been illustrated and described with respect to a particular embodiment thereof, it should be appreciated by those of ordinary skill in the art, that various modifications to this invention may be made without departing from the spirit and scope of the present invention. For example, the present invention is described to correct both the lateral and longitudinal errors, however, the drive apparatus 10 can be configured to correct either lateral or longitudinal error separately.

What is claimed is:

1. A friction drive apparatus for feeding a strip material in a longitudinal direction along a feed path for performing a work operation such as printing, plotting, or cutting, said strip material having a first longitudinal edge and a second longitudinal edge, said friction drive apparatus comprising:

a first friction wheel associated with said first longitudinal edge of said strip material;

a second friction wheel associated with said second longitudinal edge of said strip material;

a first motor drive for rotating said first friction wheel;

a second motor drive for rotating said second friction wheel; and a motion processor for controlling said first motor drive and said second motor drive independently to correct position of said strip material during performance of said work operation on said sheet material as said sheet material is being advanced along said feed path.

2. The friction drive apparatus according to claim 1 further comprising a detection sensor for monitoring lateral position of said strip material.

3. The friction drive apparatus according to claim 2 wherein said detection sensor is disposed behind said first friction wheel and said second friction wheel with respect to direction of motion of said strip material, said sensor generating a sensor signal being received by said motion processor.

4. The friction drive apparatus according to claim 2 wherein said detection sensor comprises a first sensor and a second sensor disposed in front of said first friction wheel and said second friction wheel with respect to direction of motion of said strip material, said first and second sensors generate sensor signals to determine lateral deviation of said strip material at a steering point disposed behind said first and second friction wheels.

5. The friction drive apparatus according to claim 2 wherein said detection sensor is positioned along said first longitudinal edge of said strip material.

6. The friction drive apparatus according to claim 2 wherein said detection sensor is positioned along an edge of a strip disposed on the underside of said strip material.

7. The friction drive apparatus according to claim 2 wherein said detection sensor generates a sensor signal proportional to an area of said sensor being covered by said strip material.

8. The friction drive apparatus according to claim 2 wherein said detection sensor generates a sensor signal, said sensor signal is positive when area greater than fifty percent (50%) of said sensor being covered and negative when area lesser than fifty percent (50%) of said sensor being covered.

9. The friction drive apparatus according to claim 2 wherein said motion processor in response to a sensor signal received from said detection sensor commands said first motor drive and said second motor drive to rotate said first friction wheel and said second friction wheel, respectively, independently at different speeds to properly align and position said strip material.

10. The friction drive apparatus according to claim 1 further comprising:

a first pinch roller cooperating with said first friction wheel to engage said strip material and to move said strip material along said feed path; and a second pinch roller cooperating with said second friction wheel to engage said strip material and to move said strip material along said feed path.

11. The friction drive apparatus according to claim 1 further comprising:

means for detecting an actual longitudinal position of said strip material, said means for detecting communicating with said motion processor.

12. The friction drive apparatus according to claim 11 wherein said motion processor compares a commanded longitudinal position and said actual longitudinal position of said strip material to detect and correct longitudinal error.

13. The friction drive apparatus according to claim 11 wherein said means for detecting is a free running wheel.

14. The friction drive apparatus according to claim 11 wherein said means for detecting is an optical sensor.

15. The friction drive apparatus according to claim 1 further comprising:

a first sensor positioned along said first longitudinal edge of said strip material on one side of said first friction wheel; and a second sensor positioned along said first longitudinal edge of said strip material on another side of said first friction wheel;

said motion processor driving said first and second motor drives to cause said strip material to move longitudinally along said feed path in each direction, said motion processor responding at any given time to one of said first and second sensors disposed behind said first friction wheel with respect to direction of motion of said strip material.

16. The friction drive apparatus according to claim 1 further comprising:

a third friction wheel coupled to said first friction wheel to drive said strip material in longitudinal direction.

17. A friction drive apparatus for feeding a strip material in a longitudinal direction along a feed path for performing a work operation such as printing, plotting, or cutting, said strip material having a first longitudinal edge and a second longitudinal edge, said friction drive apparatus comprising:

a first friction wheel associated with said first longitudinal edge of said strip material;

a second friction wheel associated with said second longitudinal edge of said strip material;

a first motor drive for rotating said first friction wheel;

a second motor drive for rotating said second friction wheel;

a sensor disposed behind said first friction wheel with respect to direction of motion of said strip material for substantially continuously monitoring lateral position of said strip material and generating a sensor signal upon detection of a lateral deviation of said strip material from said feed path; and a motion processor for controlling speed of said first motor drive and said second motor drive differentially in response to said sensor signal for correcting position of said strip material during said work operation.

18. The friction drive apparatus according to claim 17 wherein said sensor is positioned along said first longitudinal edge of said strip material.

19. The friction drive apparatus according to claim 17 wherein said sensor signal is proportional to an area of said sensor being covered by said strip material.

20. The friction drive apparatus according to claim 17 wherein said sensor signal is positive when area greater than fifty percent (50%) of said sensor is covered and negative when area lesser than fifty percent (50%) of said sensor is covered.

21. A friction drive apparatus for feeding a strip material in a longitudinal direction through a feed path for performing a work operation such as printing, plotting, or cutting, said strip material having a first longitudinal edge and a second longitudinal edge, said friction drive apparatus comprising:

a first friction wheel disposed along said first longitudinal edge of said strip material;

a second friction wheel disposed along said second longitudinal edge of said strip material;

a first motor drive for rotating said first friction wheel;

a second motor drive for rotating said second friction wheel;

a sensor disposed behind said first friction wheel with respect to direction of motion of said strip material for monitoring lateral position of said strip material and generating a sensor signal during movement of said strip material upon detection of a lateral deviation of said strip material from said feed path;

means for detecting an actual longitudinal position of said strip material; and a motion processor for controlling speed of said first motor drive and said second motor drive independently upon receiving said sensor signal, said motion processor imposing a differential signal upon said first and second motor drives to correct lateral deviations of said strip material from said feed path, said motion processor comparing a commanded longitudinal position and said actual longitudinal position of said strip material to detect and correct longitudinal error, said lateral deviation and longitudinal errors being corrected during performance of said work operation.

* * * * *